United States Patent
Pekarek et al.

(10) Patent No.: US 12,461,382 B2
(45) Date of Patent: *Nov. 4, 2025

(54) MULTI-AXIS SECTOR MOTOR

(71) Applicant: DRS Network & Imaging Systems, LLC, Melbourne, FL (US)

(72) Inventors: Brian R. Pekarek, Fairview, TX (US); Milton A. Woodall, Rowlett, TX (US); Jim Royalty, Dallas, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 396 days.

This patent is subject to a terminal disclaimer.

(21) Appl. No.: 18/178,149

(22) Filed: Mar. 3, 2023

(65) Prior Publication Data

US 2023/0204971 A1 Jun. 29, 2023

Related U.S. Application Data

(63) Continuation of application No. 16/359,742, filed on Mar. 20, 2019, now Pat. No. 11,624,935, which is a continuation of application No. 14/208,666, filed on Mar. 13, 2014, now Pat. No. 10,302,960.

(60) Provisional application No. 61/782,905, filed on Mar. 14, 2013.

(51) Int. Cl.
*H02K 7/14* (2006.01)
*G02B 27/64* (2006.01)
*H02K 41/035* (2006.01)

(52) U.S. Cl.
CPC ............... *G02B 27/64* (2013.01); *H02K 7/14* (2013.01); *H02K 41/0358* (2013.01); *H02K 2201/18* (2013.01); *H02K 2213/03* (2013.01)

(58) Field of Classification Search
CPC ........ H02K 33/12; H02K 33/14; H02K 33/16; H02K 41/00; H02K 41/02; H02K 41/03; H02K 41/031; H02K 41/035; H02K 41/0358; H02K 2201/18; G02B 27/64; G02B 27/646
See application file for complete search history.

(56) References Cited

U.S. PATENT DOCUMENTS

| | | |
|---|---|---|
| 4,210,804 A | 7/1980 | LaTorre et al. |
| 4,580,461 A | 4/1986 | Sears et al. |
| 5,818,132 A | 10/1998 | Konotchick |
| 7,388,700 B1 | 6/2008 | Odhner |
| 10,302,960 B2 | 5/2019 | Pekarek et al. |

(Continued)

OTHER PUBLICATIONS

U.S. Appl. No. 14/208,666, Final Office Action, Mailed on Aug. 29, 2016, 16 pages.

(Continued)

*Primary Examiner* — Eric Johnson
(74) *Attorney, Agent, or Firm* — Kilpatrick Townsend & Stockton LLP

(57) ABSTRACT

A multi-axis motor includes a first elongate magnet member disposed in a first orientation and a second elongate magnet member disposed in a second orientation orthogonal to the first orientation and mechanically coupled to the first elongate magnet member. The first elongate magnet member is operable to adjust a first axis of a fine axis structure. The second elongate magnet member is operable to adjust a second axis of the fine axis structure.

20 Claims, 12 Drawing Sheets

(56) References Cited

U.S. PATENT DOCUMENTS

| | | | |
|---|---|---|---|
| 11,624,935 B2 * | 4/2023 | Pekarek | H02K 7/14 359/554 |
| 2002/0181839 A1 | 12/2002 | Brown et al. | |
| 2004/0124717 A1 * | 7/2004 | Corcoran | H02K 41/031 345/161 |
| 2008/0169891 A1 * | 7/2008 | Umeda | G02B 7/003 335/229 |
| 2009/0160951 A1 * | 6/2009 | Anderson | H04N 23/6811 348/208.4 |
| 2010/0171377 A1 * | 7/2010 | Aicher | G01C 21/18 396/428 |
| 2013/0206967 A1 | 8/2013 | Shpunt et al. | |
| 2014/0268339 A1 | 9/2014 | Pekarek et al. | |
| 2018/0113277 A1 * | 4/2018 | Balaban | H01F 7/081 |
| 2021/0141191 A1 * | 5/2021 | Böhme | G02B 7/182 |

OTHER PUBLICATIONS

U.S. Appl. No. 14/208,666, Final Office Action, Mailed on Feb. 2, 2018, 19 pages.
U.S. Appl. No. 14/208,666, Non-Final Office Action, Mailed on Feb. 10, 2016, 14 pages.
U.S. Appl. No. 14/208,666, Non-Final Office Action, Mailed on Jul. 13, 2017, 20 pages.
U.S. Appl. No. 14/208,666, Notice of Allowance, Mailed on Dec. 28, 2018, 13 pages.
U.S. Appl. No. 14/208,666, Notice of Allowance, Mailed on Jul. 17, 2018, 16 pages.
U.S. Appl. No. 16/359,742, Final Office Action, Mailed on Sep. 16, 2022, 14 pages.
U.S. Appl. No. 16/359,742, Non-Final Office Action, Mailed on Mar. 7, 2022, 15 pages.
U.S. Appl. No. 16/359,742, Notice of Allowance, Mailed on Dec. 16, 2022, 11 pages.

* cited by examiner

MULTI-AXIS SECTOR MOTOR

CROSS-REFERENCES TO RELATED APPLICATIONS

This application is a continuation of U.S. patent application Ser. No. 16/359,742, filed on Mar. 20, 2019, which is a continuation of U.S. patent application Ser. No. 14/208,666, filed on Mar. 13, 2014, which claims priority to U.S. Provisional Patent Application No. 61/782,905, filed Mar. 14, 2013, entitled "Multi-Axis Sector Motor," the disclosures of which are hereby incorporated by reference in their entirety for all purposes.

BACKGROUND OF THE INVENTION

An optical device may be stabilized when attached to an aircraft or other high volatile systems and traditional coarse stabilizers may not be sufficient. Therefore, there is a need in the art for improved methods and systems to efficiently fine tune and stabilize such an optical device system.

SUMMARY OF THE INVENTION

Exemplary embodiments of the present invention relate generally to electrical systems. More specifically, exemplary embodiments of the present invention relate to a multi-axis motor suitable for providing fine control over the position of an object. In an embodiment, a system including a fine stabilizer operable to adjust the position of the optical device across acute angles and distances is provided. The present invention is applicable to a variety of positioning and control systems.

According to an embodiment of the present invention, a multi-axis motor is provided. The multi-axis motor includes a first elongate magnet member disposed in a first orientation and a second elongate magnet member disposed in a second orientation orthogonal to the first orientation and mechanically coupled to the first elongate magnet member. The first elongate magnet member is operable to adjust a first axis of a fine axis structure. The second elongate magnet member is operable to adjust a second axis of the fine axis structure.

According to another embodiment of the present invention, a stabilized sensor system is provided. The stabilized sensor system includes a coarse axis motor system including a coarse azimuth axis member and a first motor configured to adjust the coarse azimuth axis member. The coarse axis motor system also includes a coarse elevation axis member and a second motor configured to adjust the coarse elevation axis member. The stabilized sensor system also includes a fine axis motor system including a first elongate magnet member disposed in a first orientation and a second elongate magnet member disposed in a second orientation, orthogonal to the first orientation, and mechanically coupled to the first elongate magnet member. The first elongate magnet member is operable to adjust the azimuth axis of a fine axis structure relative to the course axis motor system. The second elongate magnet member is operable to adjust the elevation axis of the fine axis structure relative to the course axis motor system.

According to a specific embodiment of the present invention, an optical device stabilization system is provided. The system includes a magnet structure comprising a first elongate magnet member disposed in a first orientation and a second elongate magnet member disposed in a second orientation orthogonal to the first orientation and mechanically coupled to the first elongate magnet member. The system also includes a device support coupled to the magnet structure. The device support is configured to support the optical device. The system further includes a first coil surrounding the first elongate magnet member and a second coil surrounding the second elongate magnet member.

Numerous benefits are achieved by way of exemplary embodiments of the present invention over conventional techniques. For example, exemplary embodiments of the present invention provide a fine axis sector motor that can actuate two axes of motion with a single compact device. The compact fine axis sector motor, which may be connected to an optical payload, provides for precise adjustment/movement of the payload over small angles for stabilization while generating force in substantially desired directions. Furthermore, embodiments of the present invention provide such a fine axis sector motor that is placed at a location with a high mechanical advantage and a direct path to the exterior of the system for efficient cooling of the system components. These and other embodiments along with many of their advantages and features are described in more detail in conjunction with the following description, claims, and figures.

BRIEF DESCRIPTION OF THE DRAWINGS

Embodiments of the present invention are described below with reference to the attached drawings, in which.

DETAILED DESCRIPTION OF SPECIFIC EMBODIMENTS

Exemplary embodiments of the present invention provide a multi-axis motor system including a four-axis gimbal. The four-axis gimbal may include, for example, two coarse axes combined with two fine axes to stabilize a payload, such as an optical payload. The two fine axes may include, for example, an azimuth axis orthogonal to an elevation axis. The multi-axis motor system includes a sector motor that positions the two fine axes of the gimbal. The sector motor provides a predetermined (e.g., limited) range (e.g. +/−2°) of angular motion, relative to the coarse axis structure, concurrently in both of the fine axes.

While exemplary embodiments describe the use of the systems and methods described herein in the context of fine axis motor control to provide orthogonal tangential forces to position and stabilize the optical payload of a gimbal system, the motor design is equally applicable to any situation requiring precise application of force to move (or to prevent movement) in single-axis or multi-axis orthogonal (or non-orthogonal) directions. Some examples include control of guidance fins/planes on flying platforms and watercraft, positioning of metering/throttling vanes or valves in fluid flow systems, remote or servo control of mechanical linkages in any number of devices and configurations, and innumerable similar and related utilizations. One of ordinary skill in the art would recognize many variations, modifications, and alternatives.

Figure 1A:
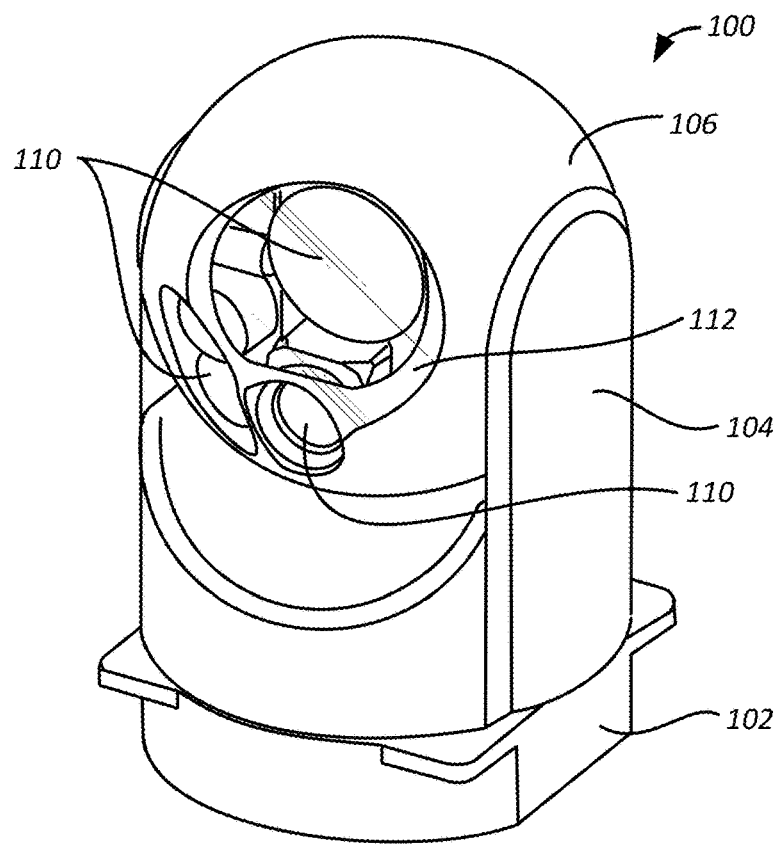
FIG. 1A illustrates a front view of a stabilized sensor system, according to exemplary embodiments of the present invention.
Figure 1B:
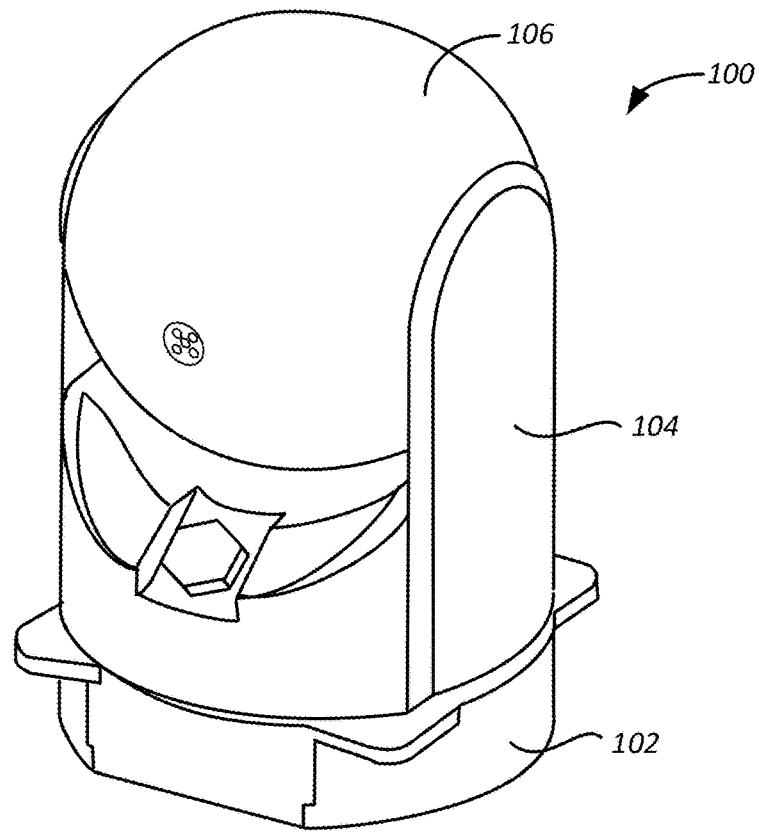
FIG. 1B illustrates a rear view of a stabilized sensor system, according to exemplary embodiments of the present invention.

FIG. 1A shows a front view and FIG. 1B shows a rear view of a stabilized sensor system 100, according to exemplary embodiments of the present invention. Stabilized sensor system 100 includes optical devices 110 and windows 112 so that optical devices 110 have a view from their position within the interior of stabilized sensor system 100 to the exterior of stabilized sensor system 100. In other words, a lens of an optical device 110 may face a window 112 so that the optical device may perform its function.

Stabilized sensor system 100 comprises mounting base 102, coarse elevation structure/member 104 and shroud 106. Mounting base 102 is configured to connect stabilized sensor system 100 to a structure on which it will be utilized, such as, for example, an airplane or other aircraft (although embodiments of the stabilized sensor system 100 may be used in a variety of different capacities, such as, for example, within a different type of gimbal, or with devices other than aircraft). Stabilized sensor system 100 also includes coarse elevation structure 104, which, in conjunction with mounting base 102, allows for stabilized sensor system 100, and more specifically shroud 106, to rotate about the system's azimuth axis (side to side). More specifically, coarse elevation structure 104 rotates with respect to mounting base 102, which is fastened to the aircraft so as to be immovable with respect to the aircraft. Therefore, coarse elevation structure 104 and mounting base 102 allow for the stabilized sensor system 100 to be coarsely adjusted about/along the azimuth axis/direction. In other words, coarse elevation structure 104 rotates with respect to mounting base 102 around an axis that runs orthogonal from the mounting base up through the coarse elevation structure 104.

Stabilized sensor system 100 also comprises shroud 106 which, as shown in FIG. 1A, houses optical devices 110. Shroud 106 is connected to coarse elevation structure 104 such that two exterior portions of coarse elevation structure 104 sandwich shroud 106 from either side of shroud 106, as shown in FIGS. 1A and 1B. Shroud 106 may pivot/rotate with respect to coarse elevation structure 104 about the system's elevation axis (up and down). Therefore, coarse elevation structure 104 and shroud 106 (i.e. coarse azimuth structure/member) allow for the stabilized sensor system 100 to be coarsely adjusted about/along the elevation axis/direction. In other words, shroud 106 rotates with respect to coarse elevation structure 104 around an axis that runs orthogonal from each side of the coarse elevation structure 104 through the shroud 106. Therefore, since the coarse elevation structure 104 (and therefore shroud 106, which is held/supported by coarse elevation structure 104) may rotate in the azimuth direction with respect to mounting base 102 and shroud 106 may rotate in the elevation direction with respect to coarse elevation structure 104, the optical devices 110 within shroud 106 may be rotated/pointed (and subsequently adjusted) in various (e.g. all) directions.

Each of mounting base 102, coarse elevation structure 104 and shroud 106 contain other components not shown in FIGS. 1A and 1B. Some of such components are described with respect to FIGS. 2A-2C.

Figure 2A:
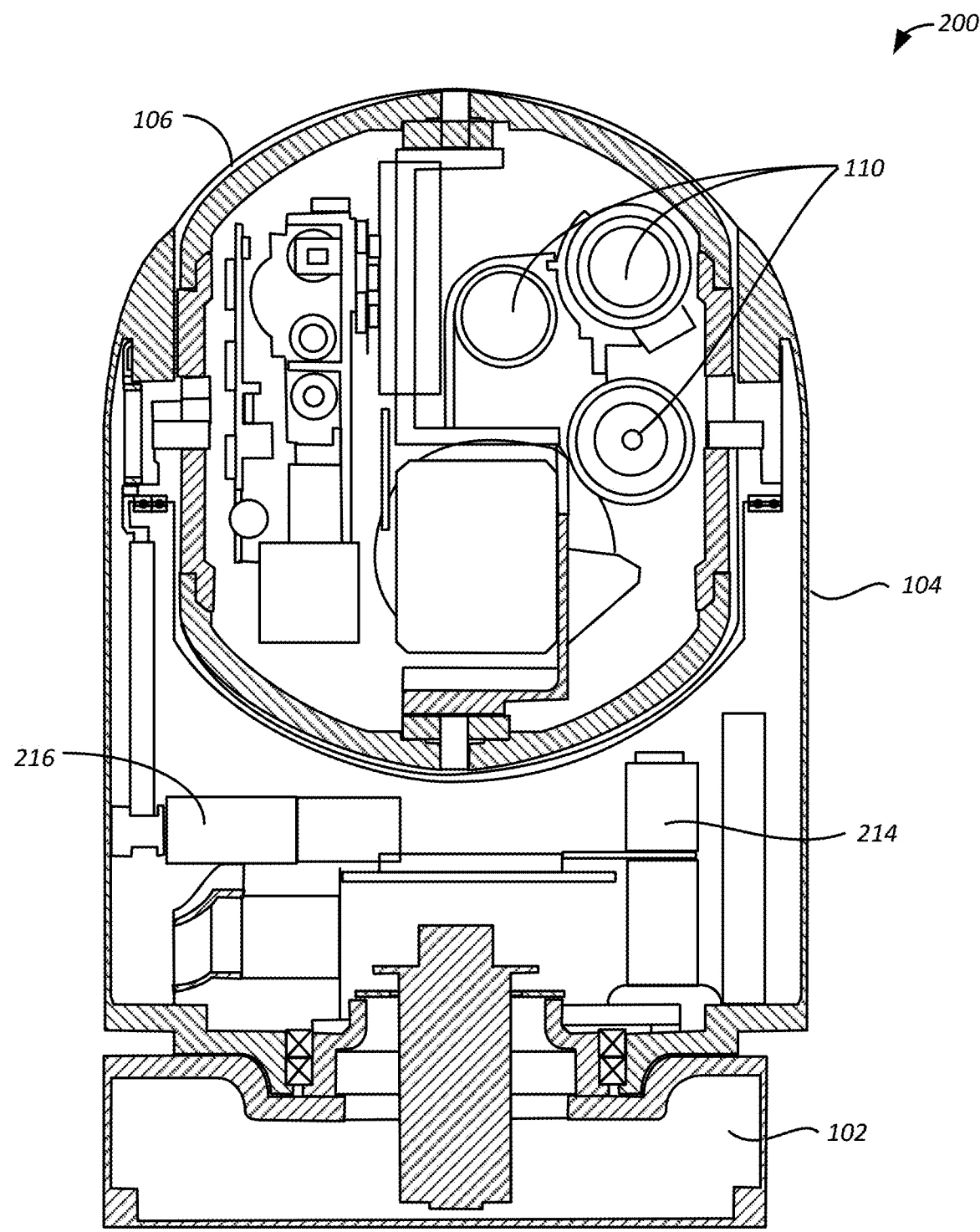
FIG. 2A illustrates a front cross-sectional view of a stabilized sensor system, according to exemplary embodiments of the present invention.

FIG. 2A shows a front cross-sectional view of a stabilized sensor system 200, according to exemplary embodiments of the present invention. Stabilized sensor system 200 includes mounting base 102, coarse elevation structure 104, and shroud 106 similar to stabilized sensor system 100. Shroud 106 houses, as in FIGS. 1A and 1B, optical devices 110. Further, FIG. 2A shows that coarse elevation structure 104 houses azimuth motor 214 and elevation motor 216. Azimuth motor 214 and elevation motor 216 could comprise any type of motor and are utilized in stabilized sensor system 200 to drive the two coarse axes, azimuth and elevation (which make up, along with the two fine axes, azimuth and elevation, a four-axis gimbal). More specifically, azimuth motor 214 is configured to drive the coarse elevation structure 104 to rotate with respect to mounting base 102 in the azimuth direction/axis. Furthermore, elevation motor 216 is connected to shroud 106 and configured to drive shroud 106 to rotate with respect to the coarse elevation structure 104 in the elevation direction/axis.

Figure 2B:
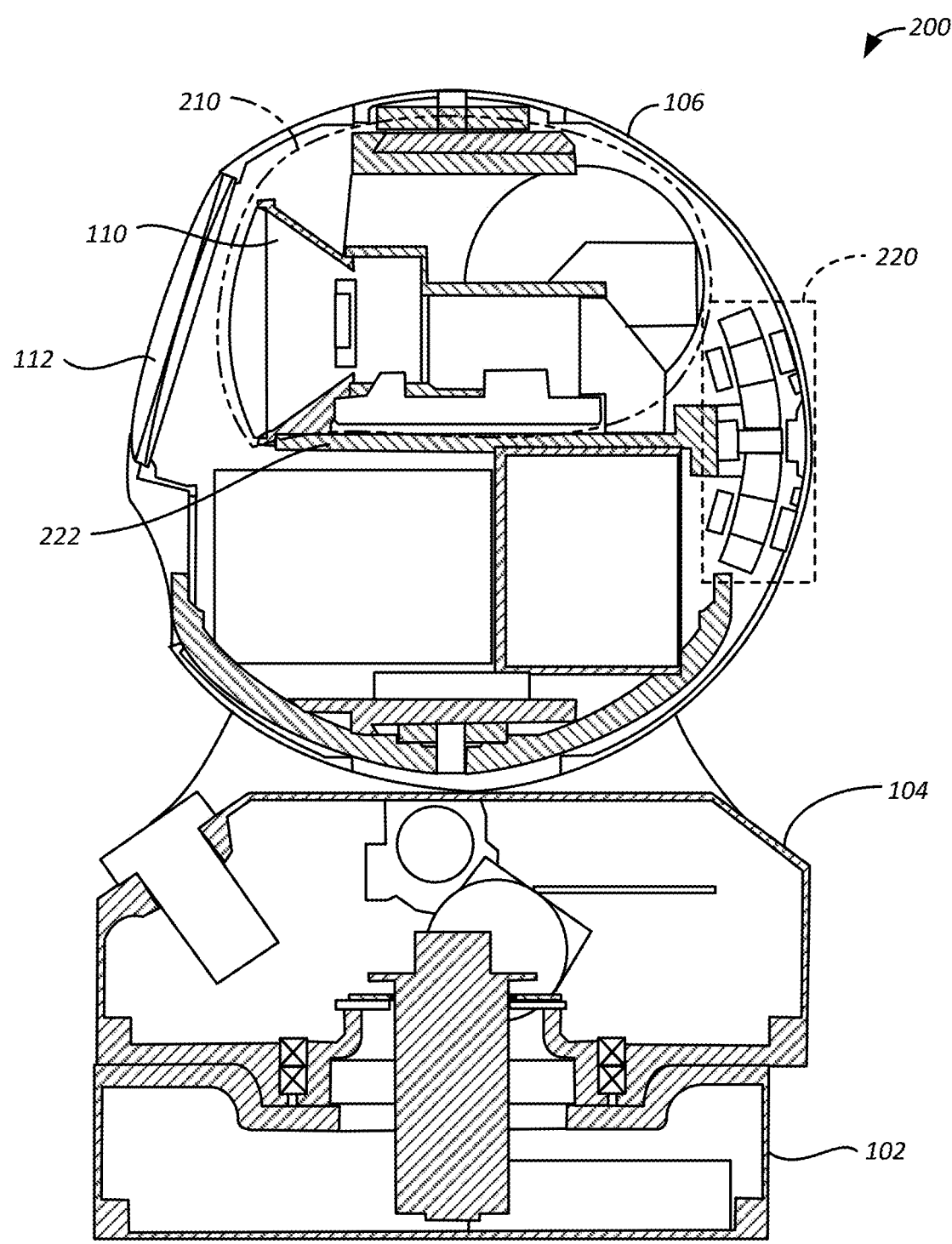
FIG. 2B illustrates a side cross-sectional view of a stabilized sensor system, according to exemplary embodiments of the present invention.
Figure 2C:
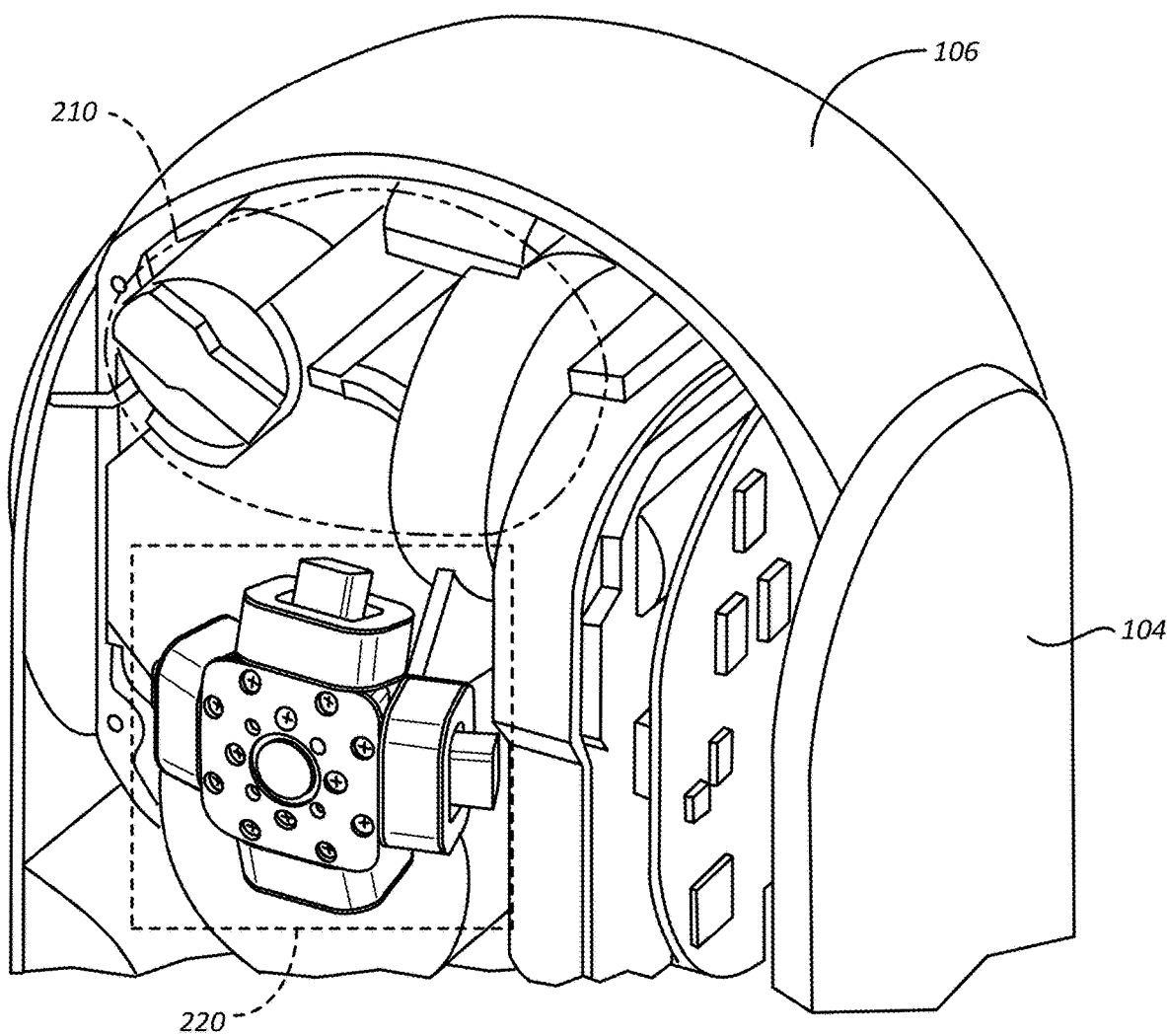
FIG. 2C illustrates a perspective cross-sectional view of a stabilized sensor system, according to exemplary embodiments of the present invention.

FIG. 2B shows a side cross-sectional view and FIG. 2C shows a perspective cross-sectional view of a stabilized sensor system 200, according to exemplary embodiments of the present invention. Stabilized sensor system 200 shown in FIGS. 2B and 2C illustrate different perspective cross-sections of shroud 106 as FIG. 2A. Shroud 106 includes optical device(s) 110 and window(s) 112, as shown in FIG. 1A. Furthermore, shroud 106 includes fine axis sector motor 220. Fine axis sector motor 220 is connected to payload support 222, which supports the optical payload 210 utilized within shroud 106. For example, optical payload 210 may include an infrared camera, a visible camera, a laser, mirrors, or any other of a wide range of optical or non-optical devices. Optical payload 210 may also include any device used to support such optical devices, including any optical device support systems that hold/carry/support the optical device(s) within the stabilized sensor system. Fine axis sector motor 220 includes two fine (as opposed to coarse) axes, azimuth and elevation, that provide more slight rotations and adjustments to the optical payload 210 than do the coarse axes. More specifically, the fine axis sector motors within exemplary embodiments of the present invention disclosed herein may adjust an optical payload in the range of, for example, +/−2° of angular motion. Fine axis sector motor 220 will be discussed further with respect to FIGS. 3A-4.

Figure 3A:
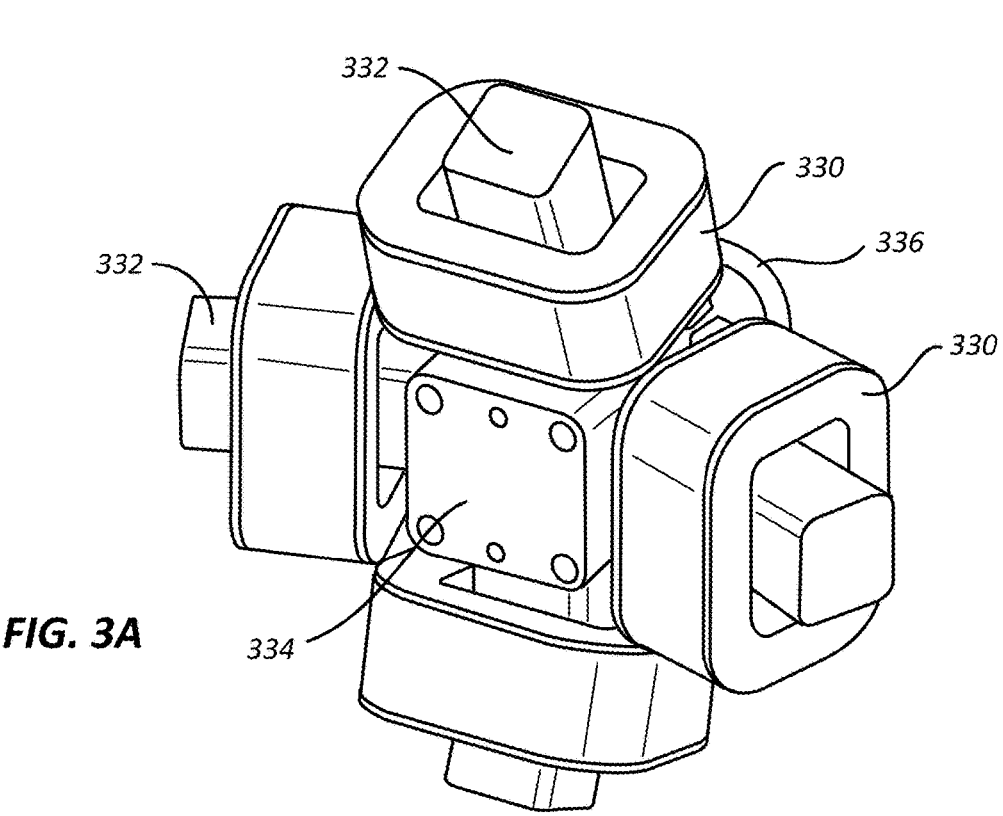
FIG. 3A illustrates a perspective view of a fine axis motor, according to exemplary embodiments of the present invention.
Figure 3B:
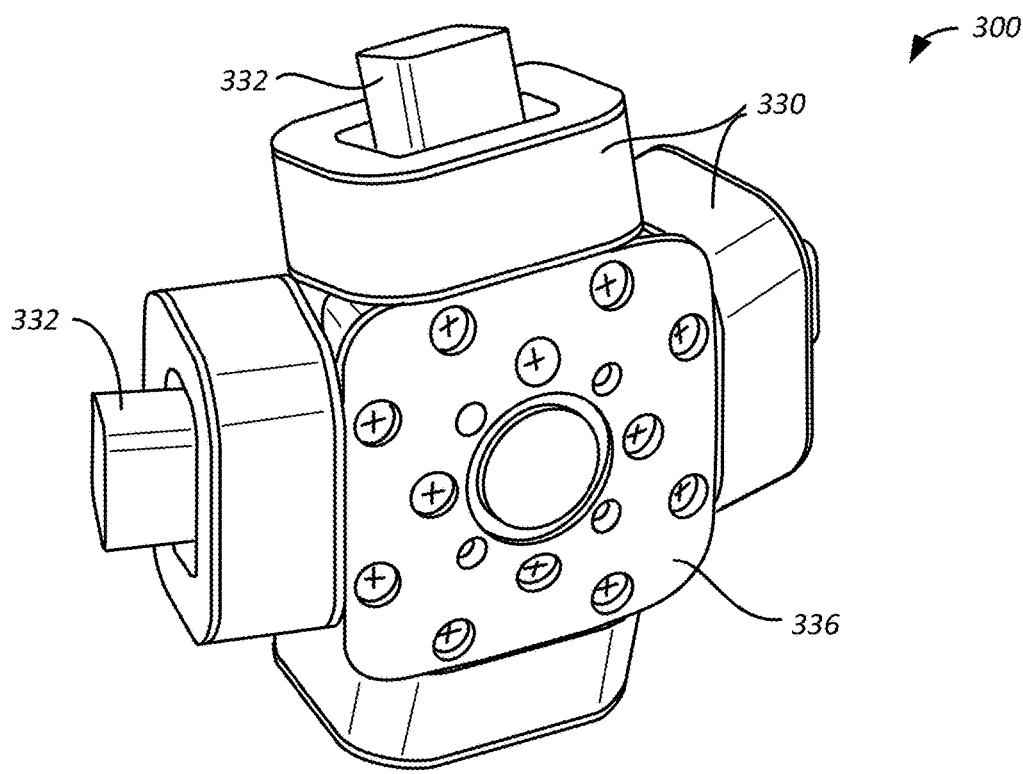
FIG. 3B illustrates a perspective of a fine axis motor, according to exemplary embodiments of the present invention.
Figure 3C:
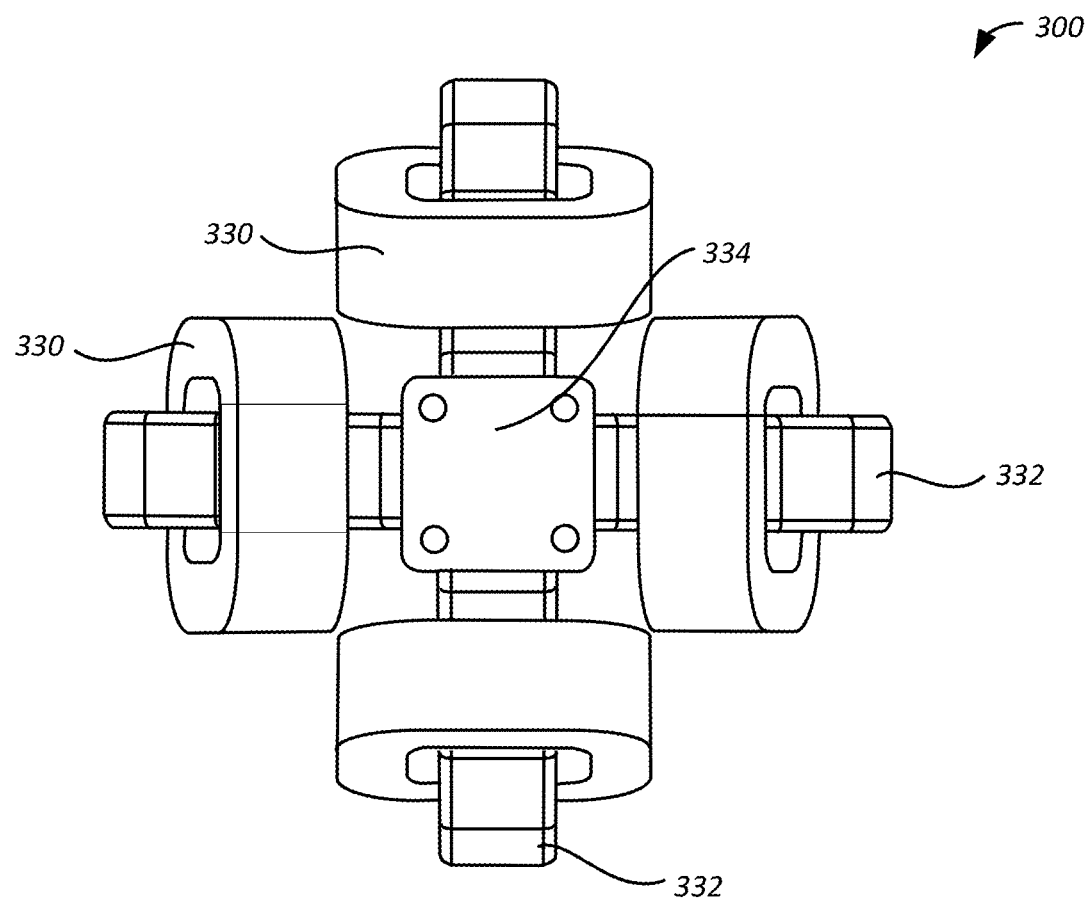
FIG. 3C illustrates a fine axis motor, according to exemplary embodiments of the present invention.

FIGS. 3A-3C show different perspectives of a fine axis motor 300, according to exemplary embodiments of the present invention. Fine axis sector motor 300 includes magnet structure 332, backing plate 336, support structure attachment 334 and four voice coils 330. Magnet structure 332 comprises two elongate magnets that are orthogonal to each other and connect at approximately their geometric centers. Each elongate magnet may be curved or arced slightly as shown, for example, in FIG. 3A. Since the two elongate magnets cross each other and connect at their geometric centers, magnet structure 332 could be described as comprising four shorter elongate members (each shorter than the two elongate magnets noted above) that protrude from support structure attachment 334 at right angles. Each of the two elongate magnets pass through a voice coil 330 at each of its ends. However, magnet structure 332 and the openings within each of voice coils 330 are dimensioned such that magnet structure 332 may hover within each of voice coils 330 without touching any of voice coils 330 (or backing plate 336).

Although embodiments of the present invention are described with four voice coils, embodiments of the present invention may include more (or less) than four voice coils (such as five, six, seven, eight, or more coils), and may utilize a variety of different types of coils (including other types of electromagnetic coils, such as a solenoid, transformers, inductor coils, electric motor coils, among others).

Fine axis sector motor 300 also includes, as noted, support structure 334, which is configured to connect to a payload support, such as payload support 222 in FIG. 2B, or any other type of structure used to support or act as optical devices or other optical payload. Fine axis sector motor 300 also includes backing plate 336. Backing plate 336 may connect to each of voice coils 330 to create a voice coil structure comprising the backing plate and the voice coils 330. Backing plate 336 is also configured to connect to the side of shroud, such as shroud 106, of the stabilized sensor system. Rigidly coupling backing plate 336 to shroud 106 allows for the fine axis sector motor to work, i.e. to adjust an optical payload coupled to support structure attachment 334.

As noted, when in use, magnet structure 332 is connected to an optical payload via support structure attachment 334. Therefore, movement of magnet structure 332 causes movement of the optical payload that it is connected to. Voice coils 330, which may be connected to a current source (not shown), cause magnet structure 332 to move within the openings of voice coils 330 when current is applied to one or more of voice coils 330. More specifically, voice coils 330, which may be controlled by an internal or external control system and/or other devices, drive fine axis sector motor 300, which in turn drives movement of any payload attached to fine axis sector motor 300.

Since the two elongate magnet members that make up magnet structure 332 are at least substantially orthogonal to each other, magnet structure 332 may move along the azimuth axis and also along the elevation axis (similar to the coarse axis structure described in FIGS. 1A-2C. For example, one elongate magnet members and its corresponding coils may drive movement in the azimuth direction or about the azimuth axis while the other elongate magnet member and its corresponding coils may drive movement in the elevation direction or about the elevation axis.

While coarse elevation structure 104, shroud 106 and mounting base 102 combine to cause coarse movement of shroud 106 and therefore any payload within shroud 106, fine axis sector motor 300 causes fine movement of such payload. As such, the fine axis sector motor provides extra stabilization beyond the capacity of the coarse axes motors. For example, fine axis sector motor 300 may cause movement of a payload attached to the motor by the amount of predetermined angular space created by the configuration of magnet structure 332 with respect to voice coils 330, such as the space between each of magnet structure 332's two elongate members and the voice coils 330 and the space between voice coils 330 and the structure in the geometric center of magnet structure 332, including support structure attachment 334. In one exemplary embodiment, as noted, the range of angular motion relative to the coarse axis structure is +/−2°, or a total range of 4°. However, various other such ranges are possible, including +/−0.1°, +/−0.2°, +/−0.3°, +/−0.4°, +/−0.5°, +/−0.6°, +/−0.7°, +/−0.8°, +/−0.9°, +/−1°, +/−1.1°, +/−1.2°, +/−1.3°, +/−1.4°, +/−1.5°, +/−1.6°, +/−1.7°, +/−1.8°, +/−1.9°, +/−2.1°, +/−2.2°, +/−2.3°, +/−2.4°, +/−2.5°, +/−2.6°, +/−2.7°, +/−2.8°, +/−2.9°, +/−3°, and so on, and any angle in between.

Furthermore, since magnet structure 332 is monolithic, or one rigid structure, and since the fine axis sector motor 300 includes voice coils 330 for both the azimuth and elevation axes, the fine axis sector motor 300 may drive movement about both the azimuth and elevation axes concurrently (e.g. simultaneously) in both axes. For example, magnet structure 332 may shift simultaneously in a direction about a longitudinal axis going through a first elongate magnet element (in a direction about an axis lateral to a second elongate magnet element) and at the same time in a direction about a longitudinal axis going through the second elongate magnet element (in a direction about an axis lateral to the first elongate magnet element). Furthermore, the movement/adjustment in both the azimuth and elevation directions may be shifted in real time about both axes concurrently as such adjustments and changes of such adjustments may occur about both axes at the same time during movement of the aircraft, or other device, that the system (and therefore, sector motor) is attached to.

Figure 4A:
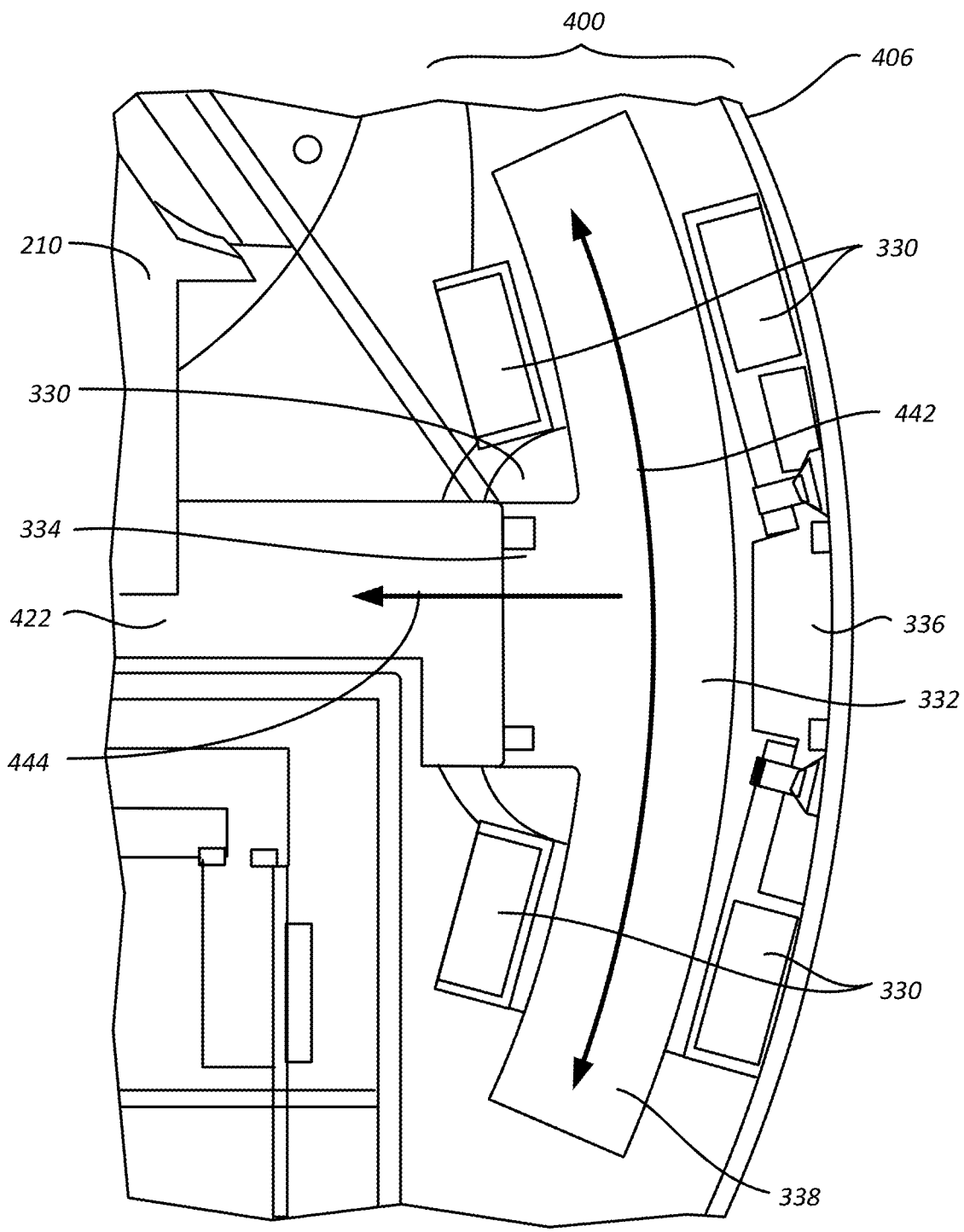
FIG. 4A illustrates a cross-section of a multi-axis sector motor connected to a shroud and an optical payload via a support structure attachment, according to exemplary embodiments of the present invention.
Figure 4B:
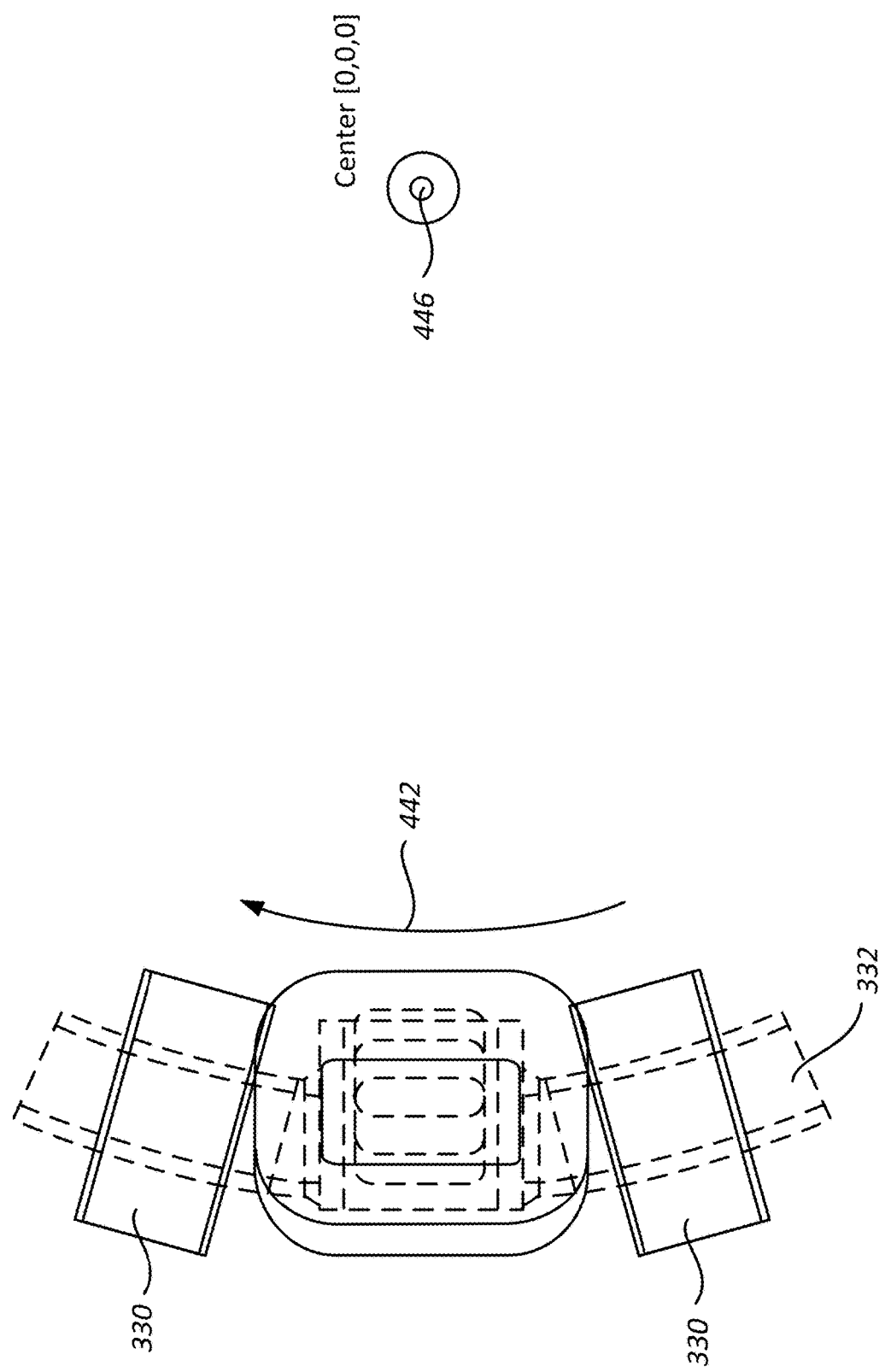
FIG. 4B illustrates an exemplary motion of a multi-axis sector motor, according to exemplary embodiments of the present invention.

FIG. 4A shows a cross-section of multi-axis sector motor 400 connected to shroud 406 via backing plate 336 and connected to an optical payload via support structure attachment 334, according to exemplary embodiments of the present invention. As shown in FIG. 4A, a first one of the elongate magnet elements of magnet structure 332 may rotate about an arced elevation axis represented by arrow 442. The arced elevation axis about which magnet structure 332 moves is further illustrated in FIG. 4B. FIG. 4B shows the arrow 442 representing the arced axis, which centers around center 446.

Referring back to FIG. 4A, magnet structure 332 moves about this axis through voice coils 330 in either direction. Since FIG. 4A shows a cross section of multi-axis sector motor 400, FIG. 4A does not show a second elongate magnet element of magnet structure 332. However, such a second elongate magnet element may be orthogonal to the first elongate magnet element as illustrated, for example, in FIGS. 3A-3C. A voice coil 330 is shown, however, in the background of multi-axis sector motor 400 in FIG. 4A. An opening through that voice coil 330 would host one end of the second elongate magnet element as illustrated in FIGS. 3A-3C. As noted, as magnet structure 332 moves, payload support 422 and optical payload 210 also move with the magnet structure 332 as payload support 422 and optical payload 210 are physically connected to magnet structure 332 via support structure attachment 334.

As noted, the magnet structure 332 is configured to move in a tangential direction about fine elevation axis 442. However, magnet structure 332 is not configured to move in a direction orthogonal to the tangential direction about fine elevation axis 442, represented by arrow 444. Arrow 444, in other words, represents radial movement, or movement orthogonal to the fine elevation axis. Such movement about axis 444 is undesirable, which will be discussed further with respect to FIGS. 6A-6B.

Figure 5A:
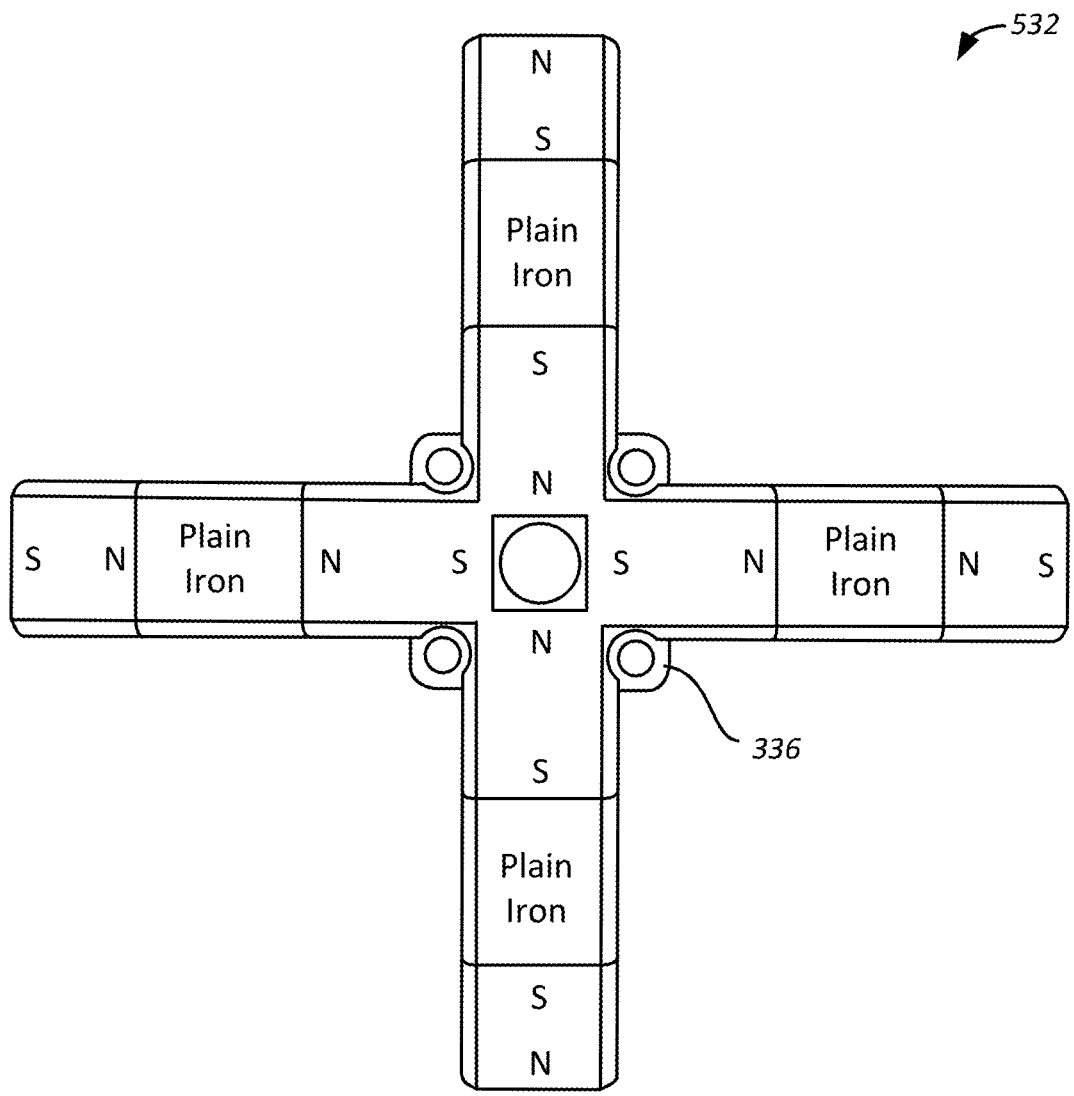
FIG. 5A illustrates a magnet structure attached to a backing plate, according to exemplary embodiments of the present invention.
Figure 5B:
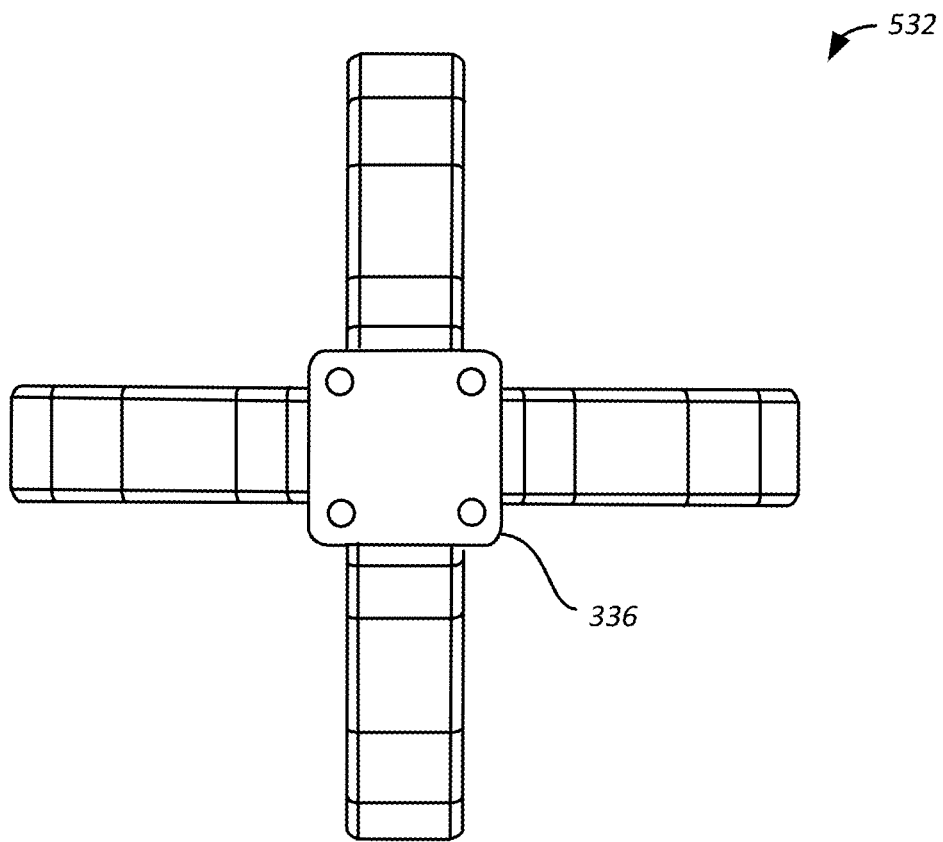
FIG. 5B illustrates a magnet structure attached to a backing plate, according to exemplary embodiments of the present invention.

FIGS. 5A and 5B show magnet structure 532 attached to backing plate 336, according to exemplary embodiments of the present invention. More specifically, FIG. 5A shows an exemplary configuration of magnet structure 532, which includes a central T or cross-shaped hub magnet, four sections of plain iron, one attached to each end of the central magnet, and four additional magnets attached to the opposite end of each section of plain iron. The four additional magnets are arranged so that opposing magnets mirror each other across the central hub magnet in a matching arrangement. In some embodiments the additional magnets are all identical, with the north poles of two of the magnets (horizontally opposed magnets) facing the center and the south poles of the other two magnets (vertically opposed magnets) facing the center. For example, the central hub and other magnets that make up magnet structure 532 may be neodymium (e.g. grade N42) magnets, or may be a variety of other types of magnets. The central hub magnet may also include, for example aluminum and/or other various metals. However, various other configurations of magnets and metals are contemplated and within the scope of exemplary embodiments of the present invention.

Figure 6A:
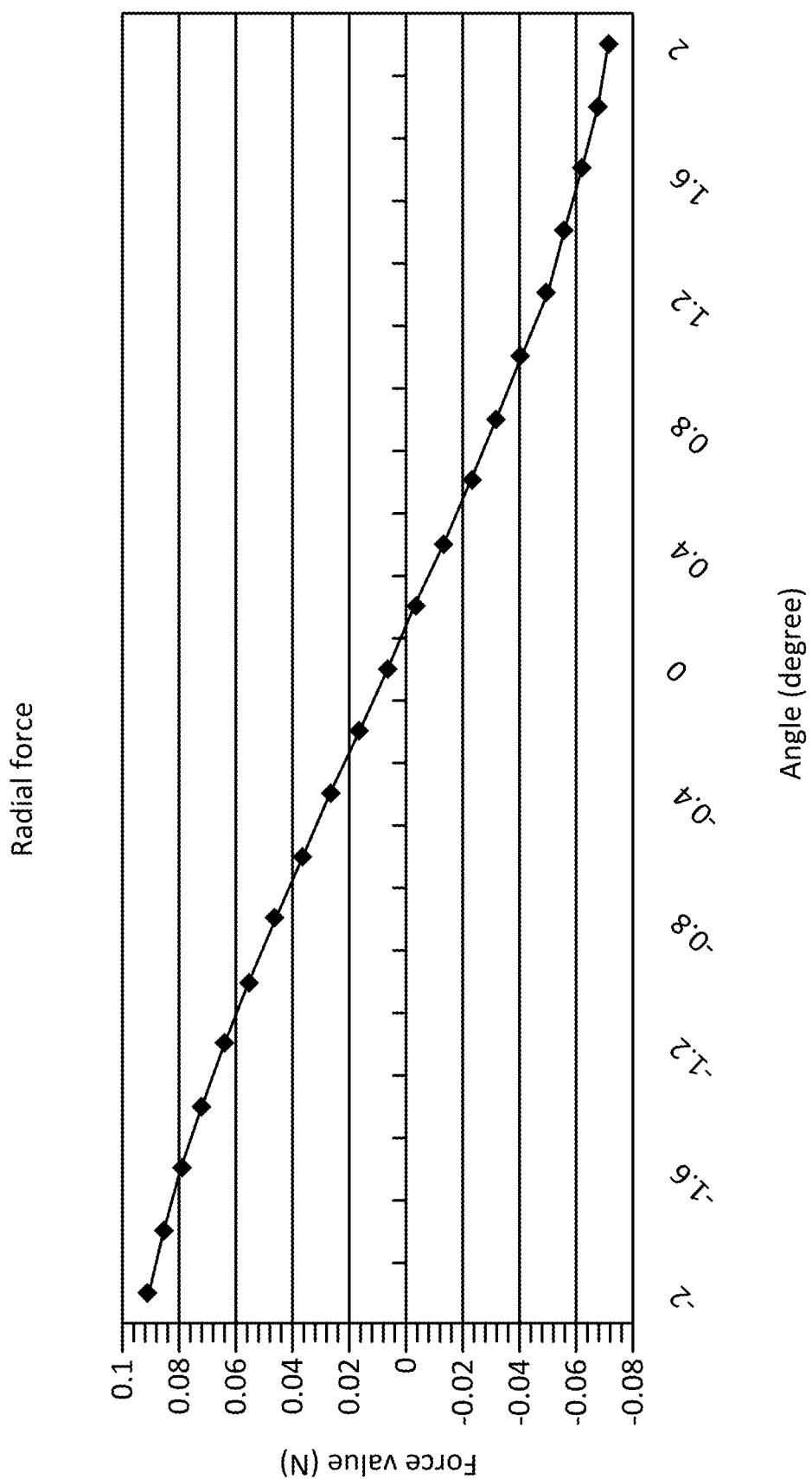
FIG. 6A illustrates a plot of the radial force value vs. angle, according to exemplary embodiments of the present invention.
Figure 6B:
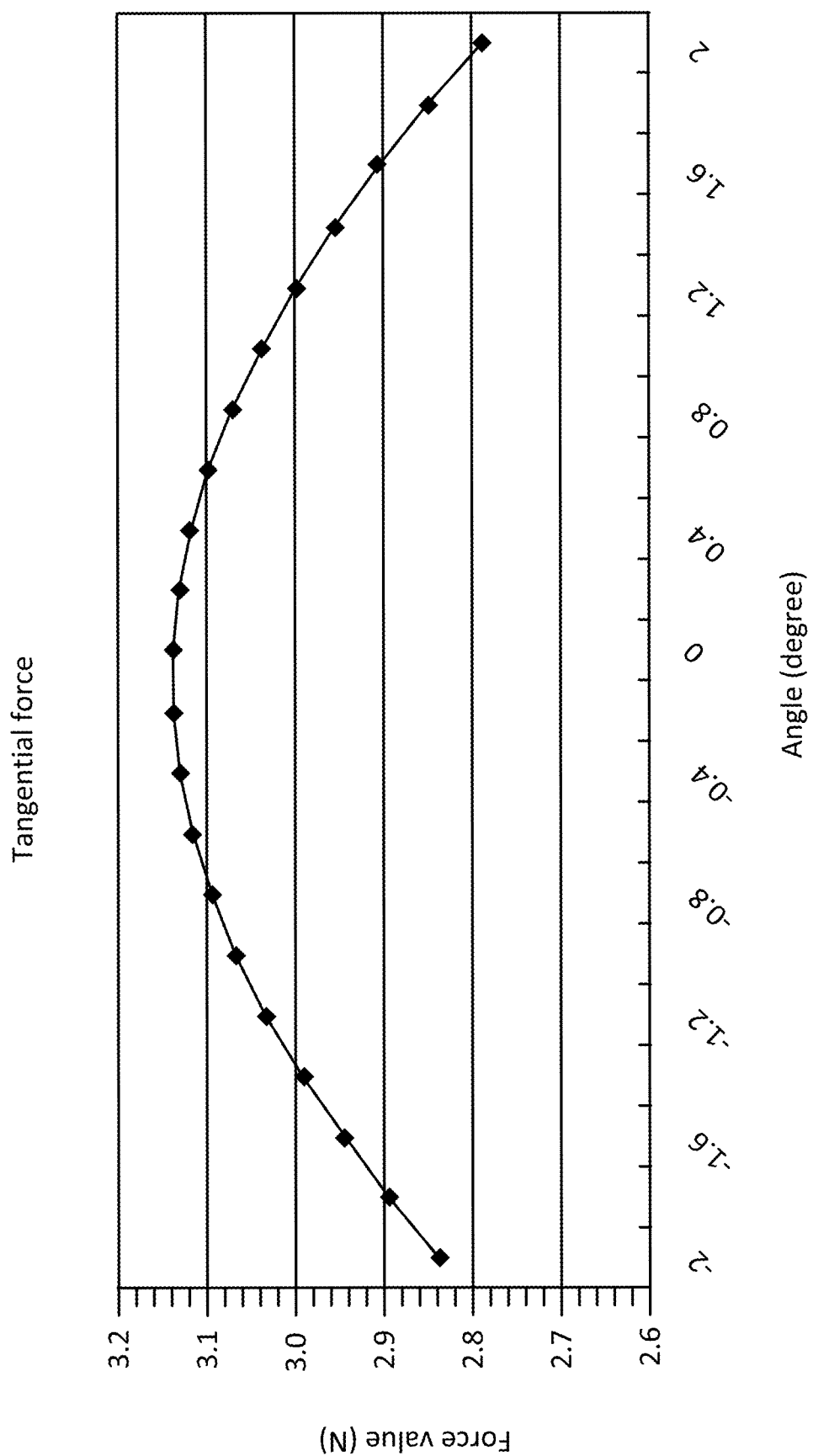
FIG. 6B illustrates a plot of the tangential force value vs. angle, according to exemplary embodiments of the present invention.

FIG. 6A shows a plot of the radial force value vs. angle, according to exemplary embodiments of the present invention, and FIG. 6B shows a plot of the tangential force value vs. angle, according to exemplary embodiments of the present invention. For example, the radial force data shown in the graph of FIG. 6A may represent any radial force caused by the multi-axis sector motor 400 in FIG. 4A, which is illustrated by arrow 444. The tangential force data shown in the graph of FIG. 6B may represent the tangential force caused by the multi-axis sector motor 400 in FIG. 4A, which is illustrated by arrow 442. As noted, a goal of the multi-axis sector motor 400 is to move, and therefore generate force, in the tangential direction about a fine elevation axis (arrow 442), and to minimize any rotational movement orthogonal to that fine elevation axis (arrow 444). As shown in FIG. 6A, the force values for the range of angles between −2° and 2° is approximately between −0.08 N and 0.09 N. On the other hand, as shown by FIG. 6B, the force values for the range of angles between −2° and 2° is approximately between 2.78 N and 3.14 N. Therefore, the range of tangential forces generated by the multi-axis sector motor is significantly greater than the range of radial forces generated by the multi-axis sector motor, according to exemplary embodiments of the present invention.

Referring back to FIGS. 2B and 2C, the fine axis sector motor 220 is located within shroud 106 and is attached to the back wall of shroud 106. The fine axis sector motor according to exemplary embodiments of the present invention may also be located in various other locations within shroud 106. However, the location of the fine axis sector motor about the edge of the shroud (at the back of the shroud) may be beneficial over other locations. For example, if the fine axis sector motor is attached to the shroud at a location towards the edge of the shroud with substantial distance between the fine axis sector motor and (approximately) the center of the shroud, the center of the axis about which the motor (or magnet structure) rotates about, less force may be required to generate movement of the magnet structure within the fine axis sector motor. In other words, the sector motor may be placed within the gimbal at the point of high (e.g., best) mechanical advantage. Since torque equals force times distance, and the amount of tangential force associated with the system may be predetermined (e.g. at least 2 N, 2.5 N, or 2.7 N). If the distance across which the torque is being calculated increases, the force required may decrease. Therefore, placement of the fine axis sector motor closer to the center of the shroud would decrease the distance thereby increasing the tangential force required to utilize the fine axis sector motor.

The location of the fine axis sector motor towards the back of the shroud is also beneficial because the back of the shroud may not be prime space within the shroud to be used for optical payload. Furthermore, the fine axis sector motor according to exemplary embodiments of the present invention is also very compact. If the fine axis sector motor did not include a magnet structure with two orthogonal elongate magnet members, and instead included two separate magnet members that were driven by two separate sets of voice coils (in other words, functioning as two separate fine axis sector motors), the motor system would take up significantly more space within the shroud.

Another benefit of embodiments of the present invention, including the location of the fine axis sector motor, includes that the fine axis sector motor controls may be heat sunk when close to the edge of the shroud. The fine axis sector motor controls, including the coils, may create significant heat while in use, and it may be heat sunk when provided a direct path to an air stream near the edge of the shroud (such as, for example, through the voice coil structure and/or the backing plate to the shroud).

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for using a multi-axis motor, the method comprising:
adjusting a first axis of a first motor by moving a first magnet member in a first coil, wherein:
the first magnet member is coupled with a support structure;
an optical device is coupled with the support structure;
the first magnet member is an elongate magnet member having a length and a width;
the length of the first magnet member is greater than the width of the first magnet member; and
the first magnet member is curved along the length of the first magnet member;
adjusting a second axis of the first motor by moving a second magnet member in a second coil, wherein:
the second magnet member is coupled with the support structure;
the second magnet member is an elongate magnet member having a length and a width;
the length of the second magnet member is greater than the width of the second magnet member;
the second magnet member is curved along the length of the second magnet member; and the first magnet member and the second magnet member protrude from the support structure at right angles so that the length of the first magnet member is orthogonal to the length of the second magnet member at the support structure; and adjusting a first axis and a second axis of a second motor, wherein the second motor is for coarse adjustment and the first motor is for fine adjustment of the optical device.

2. The method of claim 1, wherein moving the first magnet member is performed by applying a current to the first coil to cause the first magnet member to move within the first coil.

3. The method of claim 1, wherein adjusting the second axis is performed concurrently with adjusting the first axis.

4. A method for a fine adjustment for a multi-axis motor, the method comprising:

adjusting a first axis of a motor by moving a first magnet member in a first coil, wherein:
the first magnet member is an elongate magnet member having a length and a width;
the length of the first magnet member is greater than the width of the first magnet member; and
the first magnet member is curved along the length of the first magnet member; and adjusting a second axis of the motor by moving a second magnet member in a second coil, wherein:
the second magnet member is an elongate magnet member having a length and a width;
the length of the second magnet member is greater than the width of the second magnet member;
the second magnet member is curved along the length of the second magnet member; and
the second magnet member is rigidly coupled with the first magnet member.

5. The method of claim 4, wherein moving the first magnet member is performed by applying a current to the first coil to cause the first magnet member to move within the first coil.

6. The method of claim 4, wherein adjusting the second axis is performed concurrently with adjusting the first axis.

7. The method of claim 4, further comprising an optical device attached to a support structure, wherein the first magnet member and the second magnet member are coupled with the support structure so that the first magnet member and the second magnet member protrude from the support structure at right angles so that the length of the first magnet member is orthogonal to the length of the second magnet member at the support structure.

8. The method of claim 4, wherein the first magnet member and the second magnet member cross each other and connect at their geometric centers.

9. The method of claim 4, further comprising:
a third coil, wherein the third coil surrounds the first magnet member; and
a fourth coil, wherein the fourth coil surrounds the second magnet member.

10. The method of claim 4, further comprising an optical device coupled with the first magnet member and the second magnet member, wherein the first magnet member is configured to move the optical device in an arc about an azimuth axis.

11. The method of claim 10, further comprising moving the optical device through a predetermined range of angular motion using the first magnet member, wherein the predetermined range of angular motion is limited to no more than four degrees.

12. The method of claim 4, wherein the first magnet member, the second magnet member, the first coil, and the second coil are part of a fine axis motor system configured to move an optical device, and the method further comprises adjusting a coarse axis motor system coupled with the optical device.

13. The method of claim 4, wherein
the multi-axis motor comprises a third magnet member opposing the first magnet member and a fourth magnet member opposing the second magnet member; and
the first magnet member, the second magnet member, the third magnet member, and the fourth magnet member are mirrored around a center point.

14. A method for a multi-axis motor, the method comprising:

applying a first current to a first coil to generate a first magnetic field to apply a force to a first elongate magnet member, wherein the first elongate magnet member is part of a structure comprising:
a hub;
a first magnet;
a second magnet;
a first section;
a second section, wherein:
the first section is between the hub and the first magnet;
the first section rigidly couples the first magnet with the hub;
the first section is iron;
the first section and the first magnet are part of the first elongate magnet member;
the second section is between the hub and the second magnet;
the second section rigidly couples the second magnet with the hub;
the second section is iron; and
the second section and the second magnet are part of a second elongate magnet member; and applying a second current to a second coil to generate a second magnetic field to apply a force to the second elongate magnet member.

15. The method of claim 14, wherein applying the second current to the second coil is performed concurrently with applying the first current to the first coil.

16. The method of claim 14, wherein:
the structure comprises:
a third magnet;
a fourth magnet;
a third section; and
a fourth section
the third section is between the hub and the third magnet;
the third section rigidly couples the third magnet with the hub;
the third section is iron;
the third section and the third magnet are part of a third elongate magnet member;
the fourth section is between the hub and the fourth magnet;
the fourth section rigidly couples the fourth magnet with the hub;
the fourth section is iron; and
the fourth section and the fourth magnet are part of a fourth elongate magnet member; and
the method further comprises:
applying a third current to a third coil to generate a third magnetic field to apply a force to the third elongate magnet member; and applying a fourth current to a fourth coil to generate a fourth magnetic field to apply a force to the fourth elongate magnet member.

17. The method of claim 16, wherein:

the first elongate magnet member, the second elongate magnet member, the third elongate magnet member, and the fourth elongate magnet member are oriented to radiate from the hub;

the hub has a cross shape; and the first elongate magnet member is orthogonal to the second elongate magnet member.

18. The method of claim 16, wherein:

a north of the first magnet and a north of the third magnet are oriented toward the hub;

a south of the first magnet and a south of the third magnet are oriented away from the hub;

a north of the second magnet and a north of the fourth magnet are oriented away from the hub; and a south of the second magnet and a south of the fourth magnet are oriented toward the hub.

19. The method of claim 18, wherein the hub is magnetized such that:

a north magnetic field of the hub is oriented toward the first section;

a south magnetic field of the hub is oriented toward the second section;

a north magnetic field of the hub is oriented toward the third section; and a south magnetic field of the hub is oriented toward the fourth section.

20. The method of claim 16, wherein:

the first magnet, the second magnet, the third magnet, and the fourth magnet comprise neodymium; and the hub comprises aluminum.

\* \* \* \* \*